Figure 1:
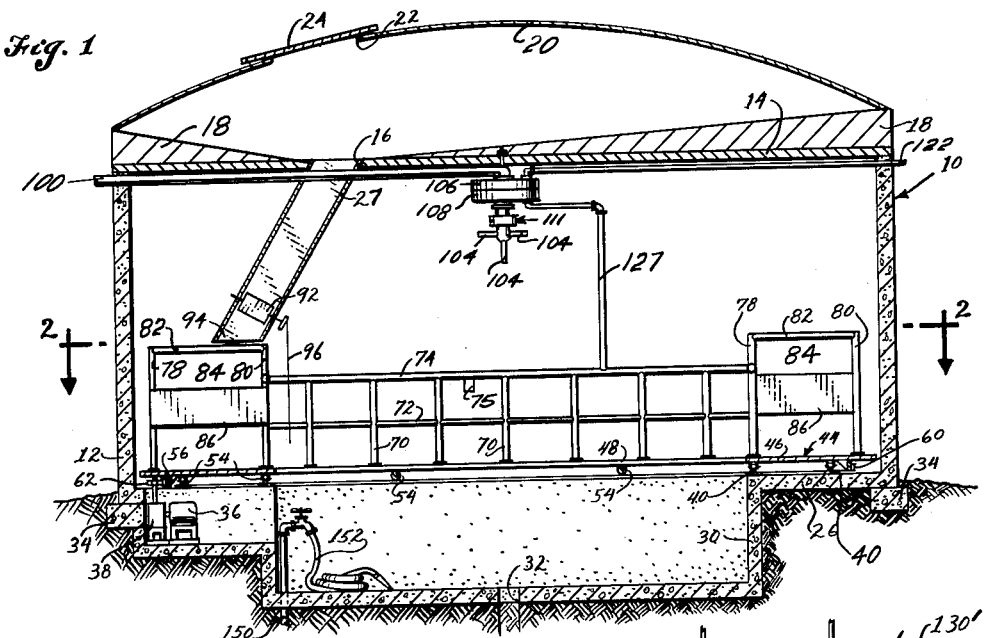

July 19, 1966 P. M. STEELHAMMER 3,261,323
MILKING PARLOR
Filed Jan. 9, 1963 2 Sheets-Sheet 1

INVENTOR.
Page M. Steelhammer
BY
TW Secrest

July 19, 1966   P. M. STEELHAMMER   3,261,323
MILKING PARLOR

Filed Jan. 9, 1963   2 Sheets-Sheet 2

INVENTOR.
Page M. Steelhammer
BY
T W Secrest

United States Patent Office 3,261,323
Patented July 19, 1966

3,261,323
MILKING PARLOR
Page M. Steelhammer, Rte. 1, Box 281, Centralia, Wash.
Filed Jan. 9, 1963, Ser. No. 250,286
4 Claims. (Cl. 119—14.04)

This invention is for a milking parlor and, more particularly, for a milking parlor in which one man can effectively milk a relatively large number of cows in a short period of time.

The milking of cows has been done for many centuries and, until the recent past, has been done by hand. In the last few decades there has been introduced milking machines for both ease of milking and for reducing the amount of hand labor required. The milking machine may be used individually so that the milk is collected in a small storage area and then carried by hand or cart to a milk tank. Or, the milking machine may be used in conjunction with a pipeline whereby the milk is collected by a machine and transferred to a pipeline and flows through the pipeline to a central cold storage tank. To reduce the labor requirements for the milking of cows and also, to do a better job, there have been designed various milking parlors. Most of the milking parlors are of a rectangular shed configuration and have an area for the cows to stand and eat while being milked. In a large number of these milking parlors, there is a recessed pit for the operator and a floor area where the cows stand while being milked. The pit may be on one side of the building, and the cows may stand with their backs to the pit. Or, the pit may be in the central part of the building and the cows may stand on each side of the pit. These milking parlors take on various means of positioning the cows. For example: the cows may stand parallel to the pit so that the operator can have freedom of movement for attaching the teat cups to the cows' teats; another manner is for the cows to stand at right angles to the pit; and, still a further manner of placing the cows in the parlor is for the cows to stand at an angle to the pit. This is known as the herringbone milking parlor. In some milking parlors there is a revolving table on which the cow stands with her head toward the center of the table and the milker milks by hand while on the table. The table revolves at a sufficiently slow rate of speed so that the cow can be milked in one revolution of the table. In a very large operation involving hundreds and maybe even thousands of cows in a dairy, the milking may be done in a long building whereby the cow steps on a conveyer and the cow's udder is washed; she is given grain to eat; and, the teat cups are attached. The cow is conveyed on a belt-like pad or mat through this long building and, while being milked, the cow eats. The number of this type of milking parlors is small as very few operators have sufficient means to afford a thousand cows or even hundreds of cows. An average dairy farmer may have anywhere from thirty-five to a hundred cows which he tends and milks himself without any or with only a small amount of additional help. With this information, and having operated a dairy farm for a few years, I have designed a small milking parlor which is inexpensive to build in that the construction is relatively simple; which is essentially a one-man operation as one man alone can tend to the milking operation; which requires relatively few steps by the operator as he is in the central part of the building and cows surround him as contrasted with the long pit whereby the operator has to walk back and forth in the long pit; is more convenient for the operator because actually he is essentially one step away and one arm length away from all of his operation; requires a relatively low labor cost to milk the cows; and, has a relatively large volume output of cows going through the milking parlor in a short period of time; let's say one to two hours. These and other objects and advantages of the invention will be more particularly put forth upon reference to the accompanying drawings, detailed specification of the invention and the appended claims.

Figure 2:
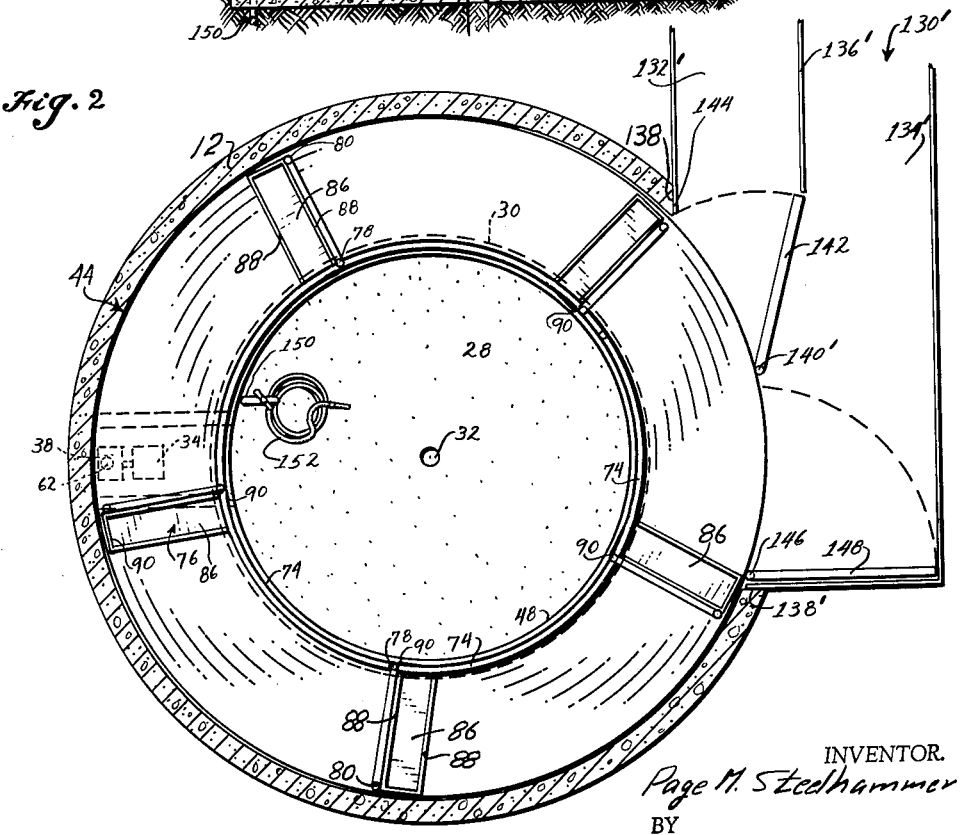
Figure 3:
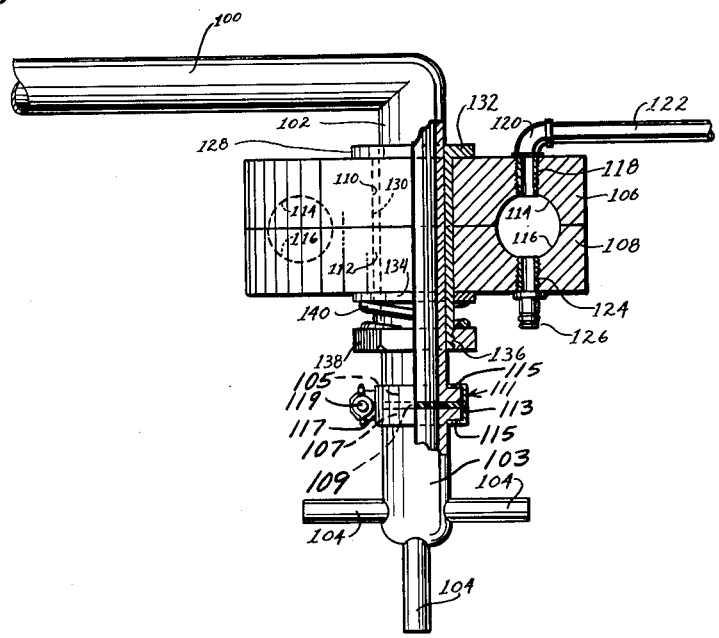
Figure 4:
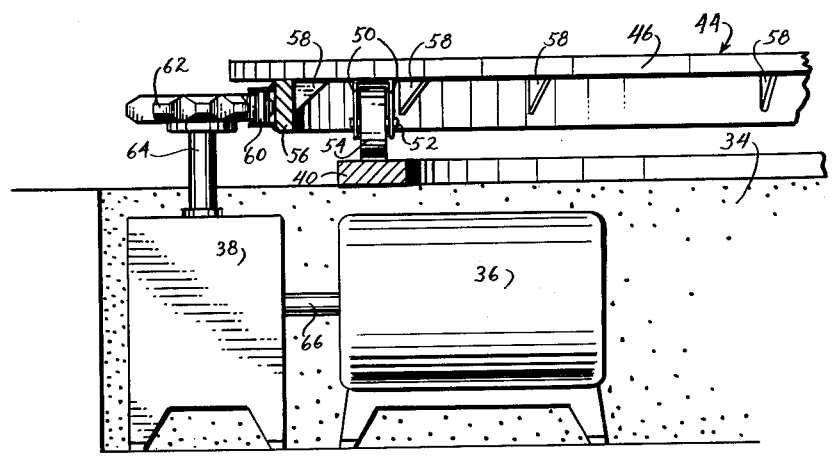

In the drawings:

FIGURE 1 is a vertical cross-sectional view of a specific embodiment of a milking parlor constructed in accordance with the preferred teachings thereof and illustrates a recessed pit area for the operator and an elevated area on which a rotating platform is supported and on which platform a cow stands while being milked;

FIGURE 2, taken on 2—2 of FIGURE 1, is a longitudinal cross-sectional view of the interior of the milking parlor and shows the recessed pit area, the platform on which five cows can simultaneously be milked and the entrance to and the exit from the platform;

FIGURE 3 is a view, partly in cross-section and partly in its entirety, and illustrates a milk line and the revolving pneumatic head; and, FIGURE 4, on an enlarged scale, is a view illustrating the drive for rotating the platform and shows the edge of the platform, the gear, a gear-reduction box and a motor for driving the gear-reduction box.

In the drawings it is seen that the invention comprises a milking parlor 10 having a circular upright housing 12. The housing 12 may be considered to be in the configuration of a cylindrical wall or cylinder. There is a cover section 14 for 12. The cover section 14 has an opening 16 near one side. Also, there is a false work 18 on top of the cover section. This false work slopes from the sides downwardly toward the opening 16. There is a roof 20 which is in the configuration of a dome. The roof 20 covers the false work 18 and has an opening 22 therein. Also, there is a cover 24 for the opening 22. The purpose of the opening 22 is to allow grain or feed to be introduced on top of the false work 18 and cover section 14. By means of a gravity feed, the feed falls through the opening 16 and into a funnel or hopper 27. The cylindrical walls 12 may be constructed of reinforced concrete and the cover section 14 can be of heavy wood construction or reinforced concrete. The false section 18 may be of reinforced wood covered by plywood or the like. The dome 20 can be of wood although the particular dome I have used is of galvanized sheet metal. The cover 24 may be of galvanized sheet metal or it may be of wood. The floor or base section of the milking parlor 10 is of two levels. There is an outer circular upper level 26 which may be of concrete and there is recessed lower pit level 28 which also may be of concrete. Connecting the upper level 26 and the lower level 28, there is a circular or cylindrical wall portion 30. In the recess section 28 there is a drain opening 32. The walls 12 may rest on footings 34. Near the circumference of the floor section 26 and underneath the same, there is a housing 34 in which there is positioned a motor 36 and a gear-reduction box 38 for driving a platform. This will be more completely explained in a later part of the specification.

On the base section 26 there are two circular base tracks 40. These tracks 40 circumscribe the pit area.

A platform 44 having a base area 46 with a central circular opening 48 is positioned over the floor section 26. The platform 44, in a plan view, see FIGURE 2, may be considered to be in the configuration of a torus. The opening 48 is of approximately the same diameter as the opening in the walls 30 or the recessed pit area.

It is seen, see FIGURES 1 and 4, that on the underneath side of the platform 46 there are two depending lugs 50. These lugs 50 holds an axle 52 for a wheel 54. The wheel 54 rides on the track 40. Near the periphery of the platform 46 there is a depending lug 56 welded to the underneath side and also is braced at 58 by numerous angle braces. On the outside of the lug 56 there is welded a chain 60. Meshing with the chain 60 is a gear 62 on the end of the shaft 64. The shaft 64 is part of the gear box 38 which is connected by shaft 66 to motor 36. The motor 36 may be an electric motor or other suitable power plant or driving means. The chain 60 may be replaced by a ring gear. From an economical standpoint it is seen that it is much cheaper to weld a chain 60 to the lug 56 than to cut a ring gear for this purpose. Therefore, in constructing my milking parlor I used chain 60. This arrangement makes it possible to rotate the platform 44. In my milking parlor the relation of the gear box, the gear 62 and the chain 60 is such as to rotate the platform 44 once every six minutes or one sixth of a revolution per minute.

The platform 46 may be of floor plate such as commonly used in steps and buildings and is made of steel; or, it may be of a steel floor plate covered by an inch or two inches of concrete. The purpose of the concrete is to provide a roughened footing for the cows' hoofs. If steel floor plate by itself is used, then the surface should be of a roughened nature for better footing for the cows.

On the inner edge of the platform 44 or near the opening 48 there is provided a guard having upright members 70 or stiles 70, middle horizontal rails 72 and an upper horizontal rail 74. The upright members 70 may be welded to the floor section 46 of the platform, and the rail 72 may be welded to the upright member 70 and likewise to the upper horizontal rail 74. However, the rail 74 is one continuous tube which is airtight and which is used as a pneumatic line. On the line 74 there are a number of valve connection means 75 for connection with the pneumatic lines of the milking machines.

In FIGURE 2 it is seen that there are places for five cows on the platform 44. For each of these five cows there is provided a feed box 76. The support for the feed box 76 comprises an upright member 78 near the inner edge of the platform and an upright member 80 near the periphery of the platform 44. These members may be welded or attached by suitable means to the platform 44. Also, there is a bracing bar 82 between the upright members 78 and 80. There is a backing board or blind board 84 positioned between 78, 80 and 82. The feed box 76 comprises a bottom 86 and upright front and back members 88 and inner and outer sides 90. It is seen that the funnel 27 leading the feed storage area or false work 18 has a butterfly valve or a valve 92. Also, it is seen that on the lower end of the funnels 26 or hoppers 26, there is a feed-direction means 94. A cord 96 hangs down from the butterfly valve 92 so that the operator can pull the cord 96, when the feed trough 76 is underneath the guide 94, so as to allow a predetermined portion of the feed to enter into the feed trough 76. In this manner, feed is provided for the cow upon the cow's entering the platform.

As is well known in the art of milking machines, where there is a pipeline system, it is necessary to have a pipeline to carry away the milk and also a source of varying air pressure or a vacuum to operate the machine. In FIGURE 3 there is illustrated a pipeline 100 which leads to a milk tank. This pipeline bends at a right angle to form an arm 102. On the lower end of this arm 102 there are illustrated a number of taps 104. To be exact, for this particular milking parlor, there should be five taps 104 as there are five cows eating simultaneously. Each of these taps 104 or connectors 104 connects with a hose line leading to the milking machine and the teat cups. Surrounding the line 102 is a rotating head having a first or stationary member 106 and a second or movable member 108. The stationary member 106 has a central opening 110 and the stationary member 108 has a central opening 112. The openings or passageways 110 and 112 are aligned with each other. In the stationary member 107, there is a circular groove 114. In the revolving member 108 there is a circular groove 116. The grooves 114 and 116 are in alignment or in coacting relationship with each other. In the stationary member 106 there is a tapped opening 118 and in which opening there is a right-angle nipple 120. Connecting with this nipple 120 is a line 122 which in turn connects with the source of varying or pulsating air pressure or vacuum so as to operate the milking machine. In the movable member 108 there is a tapped opening 124. Screwed into the opening 124 are nipples 126. The nipples 126 are for connection with an air line 127 leading to the pneumatic line 74 for use with the milking machine. Between the faces of the two members 106 and 108 there may be placed a small amount of vaseline or heavy grease or other suitable lubricant such as a silicon lubricant. It has been found from experience that, with this small amount of vaseline or heavy lubricant, that there is a sufficient air seal to allow the rotating head to operate.

To adjust the relative position of the stationary head 106 and the rotating head 108, there is provided a bushing or washer 128 on the pipe 102. This bushing or washer 128 has a sleeve portion 130. As illustrated in FIGURE 3, there is an upper flange portion 132 which is positioned above the stationary member 106. Surrounding the lower end of the sleeve portion 130 there is a washer 134 and the lower end of the sleeve portion 130 is threaded at 136. A nut 138 is screwed onto the threaded portion 136. Between the nut 138 and the washer 134, there is a spring 140. It is seen that by adjusting the position of the nut, the compression force on the spring 140 can be varied so as to adjust the position between the stationary member 106 and the movable member 108.

In FIGURE 3 there is shown the line 102. The lower end of this line is terminated above the taps 104, and connects with a line 103. And, the taps 104 are on the line 103. The lower end of 102 terminates in a collar 105, and the upper end of 103 terminates in a collar 107. Between the two collars 105 and 107 there is positioned a gasket 109. The collars 105 and 107 and the gasket 109 are held in an assembled state by a ring 11 having a circular base 113 and two inwardly directed legs 115. The base 113 is split and adjacent each of the split edges there is a lug 117. A wing nut 119 joins the two lugs 117 and thereby the two halves of the ring 111. The two collars 105 and 107 can be positioned closer together tightening the wing nut 119. From this it is seen that the line 102 is stationary and that the line 103 rotates.

The elements 105, 107, 109, 111, 113, 115, 117 and 119 are commercially available and can be purchased at a place handling dairy pipeline equipment.

In FIGURE 2 it is seen that there is a ramp 130'. Normally, a milking parlor is on elevated ground for the purpose of drainage. Therefore, so that the cows can enter and leave the parlor, there is provided a ramp. The ramp 130' has an ascending entrance 132' and a descending exit 134'. The exit and the entrance 132' and 134' are separated by a divider 136'. In the wall 12 there is an opening 138'. The ramp 130' connects with this opening. At approximately the center portion of the opening, there is an upright post 140' and a gate 142 pivoted on this post 140'. The gate 142 may swing so as to be in alignment with the divider 136' to allow the cow to enter onto the platform 44. The cow upon entering the platform 44 heads for the feed box 86. Upon the cow's completing the circle on the platform 44, it leaves the same. To insure that the cow will leave the platform 44, the gate 142 is swung or rotated toward the side wall 144. The side wall 144 may be a guard rail. This allows the cow to have only one choice and that is to step out in the exit ramp 134'. The cow steps out in the exit ramp 134' and walks away from the milking parlor. It is seen that there is another upright post 146. On this post 146 there is a gate 148. With the cow's leaving the platform 44, the gate 148 may be rotated toward the post 140' and the gate 142 may be rotated toward the separator or divider 136'. The next cow then steps onto the platform, heads for the feed trough and the milking operation may begin on this cow.

It is seen that in the pit area 28 and near the wall 30, there is provided a water tap 150. This water tap 150 connects with the hose 152. Upon completing the milking cycle, the host 152 may be employed to wash down the milking parlor. Also, this hose may be used to wash the cow.

From the foregoing detailed discussion of the invention it is seen that there is provided a milking parlor which is economical to construct and can be constructed from readily available materials. Further the milking parlor occupies a relatively small area. In addition, the operator of the parlor is actually one step away from attending to the cows and can milk the cows in a relatively brief period of time. For example, from my experience with this milking parlor, I have been able to milk sixty-five cows in approximately from 90 to 100 minutes, without the necessity of walking a considerable distance. In addition, the milking parlor has one ramp as compared with the normal two-ramp milking parlor, i.e., an entrance ramp and an exit ramp. Therefore, the cost of construction is decreased. The equipment required to rotate the platform is relatively small such as a one-half horse power engine and a gear-reduction unit. The dimensions of the milking parlor may be: interior diameter or cylindrical walls of approximately 16 feet, the width of the platform may be approximately thirty inches, the diameter of the cylindrical portion 30 may be approximately ten feet and nine inches, and the clearance between the platform and the cylindrical walls is about one-and-one half inches. The milking machines have not been described as there are a number of them commercially available.

What I claim is:

1. A milking parlor, said parlor comprising a central working area for the opeartor, a platform on which a cow stands while being milked, said platform being positioned above the working area, said platform surrounding the central working area, means to move the platform around the working area, a rotating head, said rotating head comprising a stationary member and a movable member, a groove in the face of one of the members and which face faces the other member, an inlet connection in one of the members and which connection connects with the groove, an outlet connection in the other one of the members and which connection connects with the groove, said inlet connection connecting with a source of pulsating pneumatic pressure, a first passageway in the stationary member and a second passageway in the movable member, said first and second passageways being aligned, a first tubular member passing through said passageways, one end of said first tubular member connecting with a milk line, the other end of said first tubular member connecting with a second tubular member, means to unite the first and second tubular member so that one member may rotate with respect to the other member, and said second tubular member connects with the milk line of a milking machine.

2. A milking parlor, said parlor comprising:
(a) a recessed central working area for an operator;
(b) an annular platform having a central opening;
(c) said platform being positioned above the recessed central working area and encircling said working area;
(d) an upright guard on the annular platform juxta-positioned with respect to the central opening;
(e) said upright guard comprising a hollow guard rail which functions as a pneumatic line for milking machines;
(f) five upright radial dividers on the platform;
(g) said radial dividers dividing the platform into compartments for five cows;
(h) said dividers supporting feed boxes;
(i) means to rotate said platform;
(j) an upright housing for enclosing said platform and said recessed working area;
(k) the width of the platform between the central opening and the upright housing being such as to prevent a cow from turning around on the platform;
(l) said upright housing having a ceiling structure;
(m) said ceiling structure supporting a feed storage bin;
(n) an opening in said ceiling structure;
(o) a funnel leading downward from said opening to a feed box;
(p) means to control the flow of feed through the funnel;
(q) an opening in the upright housing through which a cow passes;
(r) said opening in the upright housing being divided into an entrance and an exit for the cows;
(s) a movable means associated with the entrance to open and block the same;
(t) a movable means associated with the exit to open and block the same;
(u) said entrance directing the cows onto the platform to stand adjacent the upright guard and face in the same direction in which the platform rotates;
(v) a rotating head;
(w) said rotating head comprising a stationary member and a movable member;
(x) a groove in the face of one of the members and which face faces the other member;
(y) an inlet connection in the stationary members and which connection connects with the groove;
(z) said inlet connection connecting with a source of pulsating pneumatic pressure;
(aa) a first passageway in the stationary member and a second passageway in the movable member;
(bb) said first and second passageways being aligned;
(cc) a first tubular member passing through said passageways;
(dd) one end of said first tubular member connecting with a milk line;
(ee) the other end of said first tubular member connecting with a second tubular member;
(ff) means to unite the first and second tubular member so that one member may rotate with respect to the other member;
(gg) said second tubular member connects with the milk line of the milking machine;
(hh) an outlet connection in the movable member and which connection connects with the groove; and,
(ii) said outlet connection connects with the hollow guard rail.

3. A milking parlor, said parlor comprising:
(a) a recessed central working area for an operator;
(b) an annular platform having a central opening;
(c) said platform being positioned above the recessed central working area and encircling said working area;
(d) an upright guard on the annular platform juxta-positioned with respect to the central opening;
(e) said upright guard comprising a hollow guard rail which functions as a pneumatic line for milking machines;
(f) a multiplicity of upright radial dividers on the platform;
(g) said radial dividers dividing the platform into compartments for cows;
(h) said dividers supporting feed boxes;
(i) means to rotate said platform;
(j) an upright housing for enclosing said platform and said recessed working area;

(k) the width of the platform between the central opening and the upright housing being such as to prevent a cow from turning around on the platform;
(l) said upright housing having a ceiling structure;
(m) said ceiling structure supporting a feed storage bin;
(n) an opening in said ceiling structure;
(o) a funnel leading downward from said opening to a feed box;
(p) means to control the flow of feed through the funnel;
(q) an opening in the upright housing through which a cow passes;
(r) said opening in the upright housing being divided into an entrance and an exit for the cows;
(s) said entrance directing the cows onto the platform to stand adjacent the upright guard and face in the same direction in which the platform rotates;
(t) a rotating head;
(u) said rotating head comprising a stationary member and a movable member;
(v) a groove in the face of one of the members and which face faces the other member;
(w) an inlet connection in the stationary members and which connection connects with the groove;
(x) said inlet connection connecting with a source of pulsating pneumatic pressure;
(y) a first passageway in the stationary member and a second passageway in the movable member;
(z) said first and second passageways being aligned;
(aa) a first tubular member passing through said passageways;
(bb) one end of said first tubular member connecting with a milk line;
(cc) the other end of said first tubular member connecting with a second tubular member;
(dd) means to unite the first and second tubular member so that one member may rotate with respect to the other member;
(ee) said second tubular member connects with the milk line of the milking machine;
(ff) an outlet connection in the movable member and which connection connects with the groove; and,
(gg) said outlet connection connects with the hollow guard rail.

4. A milking parlor, said parlor comprising:
(a) a recessed central working area for an operator;
(b) an annular platform having a central opening;
(c) said platform being positioned above the recessed central working area and encircling said working area;
(d) an upright guard on the annular platform juxta-positioned with respect to the central opening;
(e) said upright guard comprising a hollow guard rail which functions as a pneumatic line for milking machines;
(f) a multiplicity of upright radial dividers on the platform;
(g) said radial dividers dividing the platform into compartments for cows;
(h) means to rotate said platform;
(i) an upright housing for enclosing said platform and said recessed working area;
(j) the width of the platform between the central opening and the upright housing being such as to prevent a cow from turning around on the platform;
(k) an opening in the upright housing through which a cow passes;
(l) said opening in the upright housing being divided into an entrance and an exit for the cows;
(m) said entrance directing the cows onto the platform to stand adjacent the upright guard and face in the same direction in which the platform rotates;
(n) a rotating head;
(o) said rotating head comprising a stationary member and a movable member;
(p) a groove in the face of one of the members and which face faces the other member;
(q) an inlet connection in the stationary members and which connection connects with the groove;
(r) said inlet connection connecting with a source of pulsating pneumatic pressure;
(s) a first passageway in the stationary member and a second passageway in the movable member;
(t) said first and second passageways being aligned;
(u) a first tubular member passing through said passageways;
(v) one end of said first tubular member connecting with a milk line;
(w) the other end of said first tubular member connecting with a second tubular member;
(x) means to unite the first and second tubular member so that one member may rotate with respect to the other member;
(y) said second tubular member connects with the milk line of the milking machine;
(z) an outlet connection with the movable member and which connection connects with the groove; and,
(aa) said outlet connection connects with the hollow guard rail.

References Cited by the Examiner

UNITED STATES PATENTS

| | | | |
|---|---|---|---|
| 1,578,951 | 3/1926 | Bersted | 285—272 X |
| 1,968,564 | 7/1934 | Luks | 119—14.04 |
| 2,316,065 | 4/1943 | Hapgood | 119—14.04 |
| 2,358,000 | 9/1944 | Cornell | 119—14.04 |
| 2,737,922 | 3/1956 | Magness | 119—14.03 |
| 2,831,709 | 4/1958 | Shaw et al. | 285—185 |
| 3,095,854 | 7/1963 | Bott et al. | 119—14.04 |
| 3,103,912 | 9/1963 | Benedetto | 119—14.04 |

FOREIGN PATENTS 69,909    9/1949    Denmark.

SAMUEL KOREN, *Primary Examiner.*
ALDRICH F. MEDBERY, *Examiner.*